US012691622B2

(12) United States Patent
Wen et al.

(10) Patent No.: US 12,691,622 B2
(45) Date of Patent: Jul. 28, 2026

(54) HYDRAULIC CIRCUIT FOR OPENING AND CLOSING MOULD OF INJECTION MOULDING MACHINE, AND INJECTION MOULDING MACHINE SYSTEM

(71) Applicant: Danfoss A/S, Nordborg (DK)

(72) Inventors: Yafei Wen, Shanghai (CN); Xiaoyan Zhao, Shanghai (CN); Cheng Zhang, Ningbo (CN); Chengguo Gao, Shanghai (CN); Wenyu Mao, Shanghai (CN); Hao Cheng, Shanghai (CN); Yong Zhang, Shanghai (CN)

(73) Assignee: DANFOSS A/S, Nordborg (DK)

( * ) Notice: Subject to any disclaimer, the term of this patent is extended or adjusted under 35 U.S.C. 154(b) by 65 days.

(21) Appl. No.: 18/775,517

(22) Filed: Jul. 17, 2024

(65) Prior Publication Data

US 2025/0026059 A1    Jan. 23, 2025

(30) Foreign Application Priority Data

Jul. 18, 2023    (CN) .......................... 202310883039.1

(51) Int. Cl.
  *B29C 45/82*    (2006.01)
  *B29C 45/67*    (2006.01)
(52) U.S. Cl.
  CPC .............. *B29C 45/82* (2013.01); *B29C 45/67* (2013.01); *B29C 2945/76709* (2013.01)
(58) Field of Classification Search
  None
  See application file for complete search history.

(56) References Cited

U.S. PATENT DOCUMENTS 3,920,034 A * 11/1975 Byers, Jr. ................ F15B 11/16
                                                          137/115.03
4,098,148 A * 7/1978 Wayman ............. F16H 63/3023
                                                          475/144
(Continued)

FOREIGN PATENT DOCUMENTS

CN            103042667 A      4/2013
CN            103895150 A  *  7/2014    ........... B29C 45/768
(Continued)

OTHER PUBLICATIONS

An Extended European Search Report for corresponding European Patent Application No. EP 24 18 7438 dated Dec. 9, 2024.

*Primary Examiner* — Emmanuel S Luk
(74) *Attorney, Agent, or Firm* — McCormick, Paulding & Huber PLLC

(57)            ABSTRACT

A hydraulic circuit for opening and closing a mould of an injection moulding machine, and an injection moulding machine system includes an operating oil cylinder and a proportional valve; by means of adjusting the proportional valve to different operating states, the operating oil cylinder can be controlled to execute different actions, so as to control mould opening, mould closing and mould differential closing of the injection moulding machine. By means of a differential proportional valve with a flow regeneration function, the present invention can effectively increase control precision in a mould opening and closing process, reduce energy consumption and the number of parts of a system, and save on space taken up by the system, with complete functions of mould opening and closing also being realizable.

6 Claims, 8 Drawing Sheets

(56)  References Cited

U.S. PATENT DOCUMENTS

| | | | | | |
|---|---|---|---|---|---|
| 4,301,697 | A | * | 11/1981 | Iwanaga | F16H 61/12 |
| | | | | | 477/906 |
| 4,455,892 | A | * | 6/1984 | Sakakibara | F16H 61/10 |
| | | | | | 477/127 |
| 5,219,584 | A | * | 6/1993 | Itsuzi | B29C 45/67 |
| | | | | | 264/40.5 |
| 6,280,170 | B1 | * | 8/2001 | Furuya | B29C 45/82 |
| | | | | | 425/150 |
| 2003/0003178 | A1 | * | 1/2003 | Kami | B22D 17/266 |
| | | | | | 425/451.2 |
| 2009/0263530 | A1 | * | 10/2009 | Hakoda | B29C 45/5008 |
| | | | | | 425/149 |
| 2016/0144543 | A1 | * | 5/2016 | Galati | B29C 45/2806 |
| | | | | | 425/162 |
| 2020/0164430 | A1 | * | 5/2020 | Miyazaki | B29C 45/76 |
| 2020/0332911 | A1 | * | 10/2020 | Wechsel | F16K 31/0693 |
| 2020/0398468 | A1 | * | 12/2020 | Jorg | B29C 45/281 |
| 2023/0166439 | A1 | * | 6/2023 | Hidaka | B29C 49/42 |
| | | | | | 264/40.5 |

FOREIGN PATENT DOCUMENTS

| | | | | | |
|---|---|---|---|---|---|
| CN | 111605155 | A | | 9/2020 | |
| CN | 112123725 | A | | 12/2020 | |
| DE | 3818264 | A1 | | 12/1989 | |
| DE | 102005017878 | B3 | * | 9/2006 | B30B 15/163 |
| DE | 102023119506 | A1 | * | 2/2024 | B29C 45/1742 |
| EP | 0592945 | B1 | | 6/1997 | |
| JP | S51-20952 | A | | 2/1976 | |

* cited by examiner

HYDRAULIC CIRCUIT FOR OPENING AND CLOSING MOULD OF INJECTION MOULDING MACHINE, AND INJECTION MOULDING MACHINE SYSTEM

CROSS-REFERENCE TO RELATED APPLICATION

This application claims foreign priority benefits under 35 U.S.C. § 119 to Chinese Patent Application No. 202310883039.1 filed on Jul. 18, 2023, the content of which is hereby incorporated by reference in its entirety.

TECHNICAL FIELD

The present invention relates to the technical field of hydraulics, in particular to a hydraulic circuit for opening and closing a mould of an injection moulding machine, and an injection moulding machine system that is provided with the hydraulic circuit.

BACKGROUND

Referring to FIG. 1, in a hydraulic circuit for opening and closing a mould of a medium-sized injection moulding machine, apart from a pressurized oil supply end P', an oil return end T' and a mould closing oil cylinder 01, further provided are a first directional-control valve 03 (a four-way three-position solenoid valve), a second directional-control valve 02, a brake valve 04, a safety valve 05 and a safety gate 06. A detection part 051 of the safety valve 05 is linked to the safety gate 06 of a device; a main valve part 052 of the safety valve 05 can only open when the safety gate 06 is fully closed. By means of the second directional-control valve 02 and a middle oil path 021 connected thereto, flow regeneration in a mould closing process can be realized, thus increasing a mould closing speed; by means of the brake valve 04, a moving mould plate can be stopped with precision when it is necessary to stop the motion thereof. The brake valve 04 is formed from a cartridge valve 041 and a third directional-control valve 042, different flow paths of the third directional-control valve 042 having different damping magnitudes; return oil back pressures of different magnitudes are produced by means of controlling the third directional-control valve 042, thereby obtaining different brake effects.

The hydraulic circuit for opening and closing a mould of this medium-sized injection moulding machine has the following defects:

1) In order to complete mould opening and closing actions, it is necessary to configure a first directional-control valve 03 for controlling opening and closing of the mould, a brake valve 04, and a second directional-control valve 02 and a middle oil path 021 connected thereto for realizing mould differential closing. It can be seen that there are quite a lot of valve members therein, pipeline connections are quite complicated and costs are quite high, and it is necessary to precisely match the first directional-control valve 03 and the brake valve 04, and the directional-control valve 03 and the brake valve 04 both work in a one-move-to-one-fixed-position manner, and it is not possible to perform adjustment with electrical signals; therefore trial adjustment is very difficult, and precision of mould opening and closing is relatively poor. In addition, tooling for mounting the three valves is larger and the machine takes up more space.

2) The action of an injection moulding machine performing mould opening is a slow (a mould opening mould/mould breaking stage)-fast (a middle fast stage)-slow (a final braking stage) process. The ideal situation is a fast stage without a brake effect, only with braking during a slow stage, but since all the return oil returns to an oil tank after passing through the brake valve 04, the brake effect is all controlled by the third directional-control valve 042, and the control of braking by the third directional-control valve 042 only has two states: light braking without power and heavy braking with power; therefore, there is actually also a clear brake effect in the fast stage, which reduces the speed of opening the mould and increases energy consumption.

3) There are many models of machine that apply such a braking principle; therefore, different models all require corresponding testing, and an ideal brake effect is obtained by means of altering the damping in flow paths of the third directional-control valve 042, which is relatively troublesome, and obtaining the optimum brake effect in practice is difficult.

Therefore, how to optimize the hydraulic circuit for opening and closing a mould of an injection moulding machine is a technical problem to be urgently solved by a person skilled in the art.

SUMMARY

In view of this, the purpose of the present invention lies in providing an injection moulding machine system and a hydraulic circuit for opening and closing a mould thereof; by means of a differential proportional valve with a flow regeneration function, with complete functions of mould opening and closing being realizable, control precision can also be effectively increased in a mould opening or closing process, energy consumption is reduced, the number of parts of a system is cut down, and space taken up by the system is saved on.

To achieve the abovementioned objective, the present invention provides the following technical solutions:

A hydraulic circuit for opening and closing a mould of an injection moulding machine, comprising an operating oil cylinder and a proportional valve; by means of adjusting the proportional valve to different operating states, the operating oil cylinder can be controlled to execute different actions, so as to control mould opening, mould closing and mould differential closing of the injection moulding machine.

Optionally, in the hydraulic circuit for opening and closing a mould of an injection moulding machine, a first operating oil port and a second operating oil port of the proportional valve are respectively connected to a first cavity and a second cavity of the operating oil cylinder by means of a first connecting oil path and a second connecting oil path; an inlet oil port and a return oil port of the proportional valve are respectively connected to an inlet oil path and a return oil path;

when the proportional valve is in a first operating state, the first connecting oil path communicates with the inlet oil path by means of the proportional valve, the second connecting oil path communicates with the return oil path by means of the proportional valve, and the operating oil cylinder controls mould opening of the injection moulding machine;

when the proportional valve is in a second operating state, the first connecting oil path communicates with the second connecting oil path by means of the proportional valve, and the operating oil cylinder controls mould differential closing of the injection moulding machine; and when the proportional valve is in a third operating state, the first connecting oil path communicates with the return oil path by means of the proportional valve, the second connecting oil path communicates with the inlet oil path by means of the proportional valve, and the operating oil cylinder controls mould closing and pressing of the injection moulding machine.

Optionally, in the hydraulic circuit for opening and closing a mould of an injection moulding machine, when the proportional valve is in a fourth operating state, the first operating oil port, the second operating oil port, the inlet oil port and the return oil port communicate with each other. The fourth operating state is a transition state between the second operating state and the third operating state, that is, a transition position; alternatively, the fourth operating state is an operating position of the proportional valve, that is, the proportional valve is further provided with an H-type median function.

Optionally, in the hydraulic circuit for opening and closing a mould of an injection moulding machine, the proportional valve comprises a valve body, a spool and a driving apparatus;

the valve body is provided with the first operating oil port, the second operating oil port, the inlet oil port and the return oil port;

the spool can move relatively inside the valve body, and is used for controlling communication and isolation between different oil ports; and the driving apparatus is used for controlling the movement of the spool.

Optionally, in the hydraulic circuit for opening and closing a mould of an injection moulding machine, the valve body is provided with:

a first oil channel, which communicates with the return oil port, so as to connect the return oil path;

a second oil channel, which communicates with the inlet oil port, so as to connect the inlet oil path;

a third oil channel, which communicates with the first operating oil port, so as to connect the first connecting oil path; and a fourth oil channel, which communicates with the second operating oil port, so as to connect the second connecting oil path.

Optionally, in the hydraulic circuit for opening and closing a mould of an injection moulding machine, a side wall of the spool is provided with a first recess, a second recess, a third recess, a fourth recess and a fifth recess;

when the proportional valve is in the first operating state, the second oil channel communicates with the third oil channel by means of the third recess, and the fourth oil channel communicates with the first oil channel by means of the first recess;

when the proportional valve is in the second operating state, the second oil channel communicates with the fourth oil channel by means of the second recess, and the second oil channel communicates with the third oil channel by means of the fifth recess; and when the proportional valve is in the third operating state, the second oil channel communicates with the fourth oil channel by means of the second recess, and the third oil channel communicates with the first oil channel by means of the fourth recess.

Optionally, in the hydraulic circuit for opening and closing a mould of an injection moulding machine, when the proportional valve is in a fourth operating state, the fourth oil channel, the second recess, the second oil channel, the fifth recess, the third oil channel, the fourth recess and the first oil channel communicate.

Optionally, in the hydraulic circuit for opening and closing a mould of an injection moulding machine, projections of the first recess, the second recess, the third recess and the fourth recess on a central plane of the spool are arranged in sequence in an axial direction of the spool.

Optionally, in the hydraulic circuit for opening and closing a mould of an injection moulding machine, one of each of the first recess, the second recess, the third recess and the fourth recess are provided, or a plurality thereof are respectively provided along the circumference of the spool.

Optionally, in the hydraulic circuit for opening and closing a mould of an injection moulding machine, the fifth recess and the third recess are both located between the second recess and the fourth recess;

a partial region of the fifth recess and a partial region of the third recess are arranged in a staggered manner in a circumferential direction of the spool;

another region of the fifth recess is closer to the fourth recess compared to the third recess; and another region of the third recess is closer to the second recess compared to the fifth recess.

An injection moulding machine system, which is provided with the hydraulic circuit for opening and closing a mould of an injection moulding machine described above.

It can be seen from the above technical solutions that the injection moulding machine system and the hydraulic circuit for opening and closing a mould thereof provided by the present invention have the following advantages:

I. In the hydraulic circuit for opening and closing a mould of an injection moulding machine provided by the present invention, not only can the operating oil cylinder be controlled by means of the proportional valve to realize mould opening and closing actions of the injection moulding machine, but also mould differential closing can be realized by means of the proportional valve, that is, the proportional valve is a differential proportional valve having a flow regeneration function, and a differential circuit can be formed by the interior structure of the proportional valve; therefore, compared to the conventional circuit, a second directional-control valve and a middle oil path can be dispensed with, thereby reducing the number of valve members and simplifying an oil path arrangement, which is beneficial for saving on the space taken up by the system.

II. Since the proportional valve can proportionally convert input electrical signals into force or displacement, parameters such as pressure and flow are continuously controlled, that is, electrical signals of the proportional valve are easily adjusted, which can realize different flow and action characteristics. Thus, in the hydraulic circuit for opening and closing a mould of an injection moulding machine provided by the present invention, by means of the proportional valve, in the process of the operating oil cylinder driving the mould opening/mould closing of the injection moulding machine, hydraulic oil flow into and out of the operating oil cylinder can be proportionally controlled according to actual requirements, so that the mould opening speed/mould closing speed is continuously adjusted. Thus, with complete functions of mould opening and closing being realized, speed adjustment precision, positioning precision and repetition precision can be effectively increased in a mould opening/closing process.

III. Since in the mould closing process of the injection moulding machine, hydraulic oil flow into and out of the operating oil cylinder can be proportionally controlled by means of the proportional valve, not only can fast mould opening/mould closing be made possible by means of the proportional valve, but also a brake effect can be realized by means of the proportional valve, without needing to provide the brake valve; therefore, compared to the conventional circuit, the brake valve can be eliminated, so that not only can energy consumption be reduced, but also corresponding testing on different models is not necessary.

In brief, in the hydraulic circuit for opening and closing a mould of an injection moulding machine provided by the present invention, by means of replacing the first directional-control valve, the second directional-control valve and the brake valve of the conventional solution with the differential proportional valve having a flow regeneration function, with complete functions of mould opening and closing being realized, control precision can also be effectively increased in a mould opening/closing process, energy consumption is reduced, the number of parts of a system is cut down, a hydraulic circuit is simplified and the space taken up by the system is saved on, which are beneficial for reducing system costs.

BRIEF DESCRIPTION OF THE DRAWINGS

To explain the technical solutions in embodiments of the present invention or prior art more clearly, there follows a brief description of the accompanying drawings that need to be used in description of embodiments or the prior art. Obviously, the drawings in the description below are only showing some embodiments of the present invention, and a person skilled in the art could obtain other drawings based on these drawings without expending any inventive effort.

In the drawings.

01—mould closing oil cylinder, 02—second directional-control valve, 03—first directional-control valve, 04—brake valve, 021—middle oil path, 041—cartridge valve, 042—third directional-control valve,
1—operating oil cylinder, 2—proportional valve,
211—first recess, 212—second recess, 213—third recess, 214—fourth recess,
215—fifth recess,
221—first oil channel, 222—second oil channel, 223—third oil channel, 224—fourth oil channel,
2211—first opening region, 2212—second opening region,
05—safety valve, 051—detection part, 052—main valve part, 06—safety gate,
A—second operating oil port, B—first operating oil port, P—inlet oil port, T—return oil port,
L1—first connecting oil path, L2—second connecting oil path, L3—inlet oil path, L4—return oil path.

DETAILED DESCRIPTION

The technical solutions in embodiments of the present invention are described clearly and completely below with reference to the drawings in embodiments of the present invention. Obviously, the embodiments described are merely some, not all, of the embodiments of the present invention. All other embodiments obtained by those skilled in the art on the basis of the embodiments in the present invention without any creative effort fall within the scope of protection of the present invention.

Figure 2:
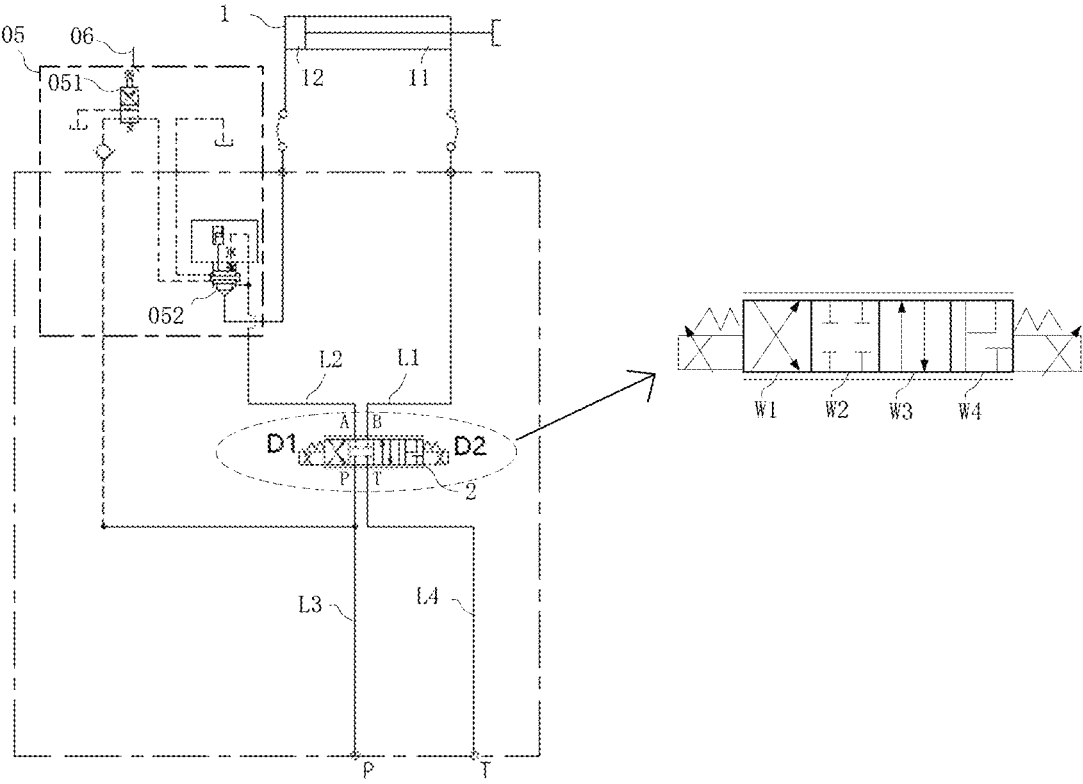
FIG. 2 is a system connection schematic drawing of a hydraulic circuit for opening and closing a mould of an injection moulding machine provided by an embodiment of the present invention.

Referring to FIG. 2, embodiments of the present invention provide a hydraulic circuit for opening and closing a mould of an injection moulding machine, the hydraulic circuit comprising an operating oil cylinder 1 and a proportional valve 2; by means of adjusting the proportional valve 2 to different operating states, the operating oil cylinder 1 can be controlled to execute different actions, so as to control mould opening, mould closing and mould differential closing of the injection moulding machine.

Specifically, the proportional valve 2 is provided with an inlet oil port P, a return oil port T, a first operating oil port B and a second operating oil port A. The inlet oil port P is connected to an inlet oil path L3, the return oil port T is connected to a return oil path L4, the first operating oil port B is connected to a first cavity 11 of the operating oil cylinder 1 by means of a first connecting oil path L1, and the second operating oil port A is connected to a second cavity 12 of the operating oil cylinder 1 by means of a second connecting oil path L2.

When the proportional valve 2 is in a first operating state, that is, when the proportional valve 2 in FIG. 2 is at a first operating position at a leftmost side (see W1 in FIG. 2), the first connecting oil path L1 communicates with the inlet oil path L3 by means of the proportional valve 2, the second connecting oil path L2 communicates with the return oil path L4 by means of the proportional valve 2, and the operating oil cylinder 1 controls mould opening of the injection moulding machine.

When the proportional valve 2 is in a second operating state, that is, when the proportional valve 2 in FIG. 2 is in a first operating position at a rightmost side (see W4 in FIG. 2), the first connecting oil path L1 communicates with the second connecting oil path L2 by means of the proportional valve 2, and the operating oil cylinder 1 controls mould differential closing of the injection moulding machine.

When the proportional valve 2 is in a third operating state, that is, when the proportional valve 2 in FIG. 2 is at a third operating position from the left (see W3 in FIG. 2), the first connecting oil path L1 communicates with the return oil path L4 by means of the proportional valve 2, the second connecting oil path L2 communicates with the inlet oil path L3 by means of the proportional valve 2, and the operating oil cylinder 1 controls mould closing and pressing of the injection moulding machine.

Specifically, the proportional valve 2 is further provided with an H-type median function, and at this time, the first operating oil port B, the second operating oil port A, the inlet oil port P and the return oil port T communicate with each other, and the system discharges. In a mould closing process, if the proportional valve 2 is in the H-type median function, then the operating oil cylinder 1 and an upper mould of the injection moulding machine connected thereto perform mould closing under the effect of gravity. When specifically implemented, the H-type median function may be a transition position between other adjacent operating positions, for example, between W3 and W4 in FIG. 2. According to requirements, the H-type median function may also be set at an operating position of the proportional valve 2.

Figure 1:
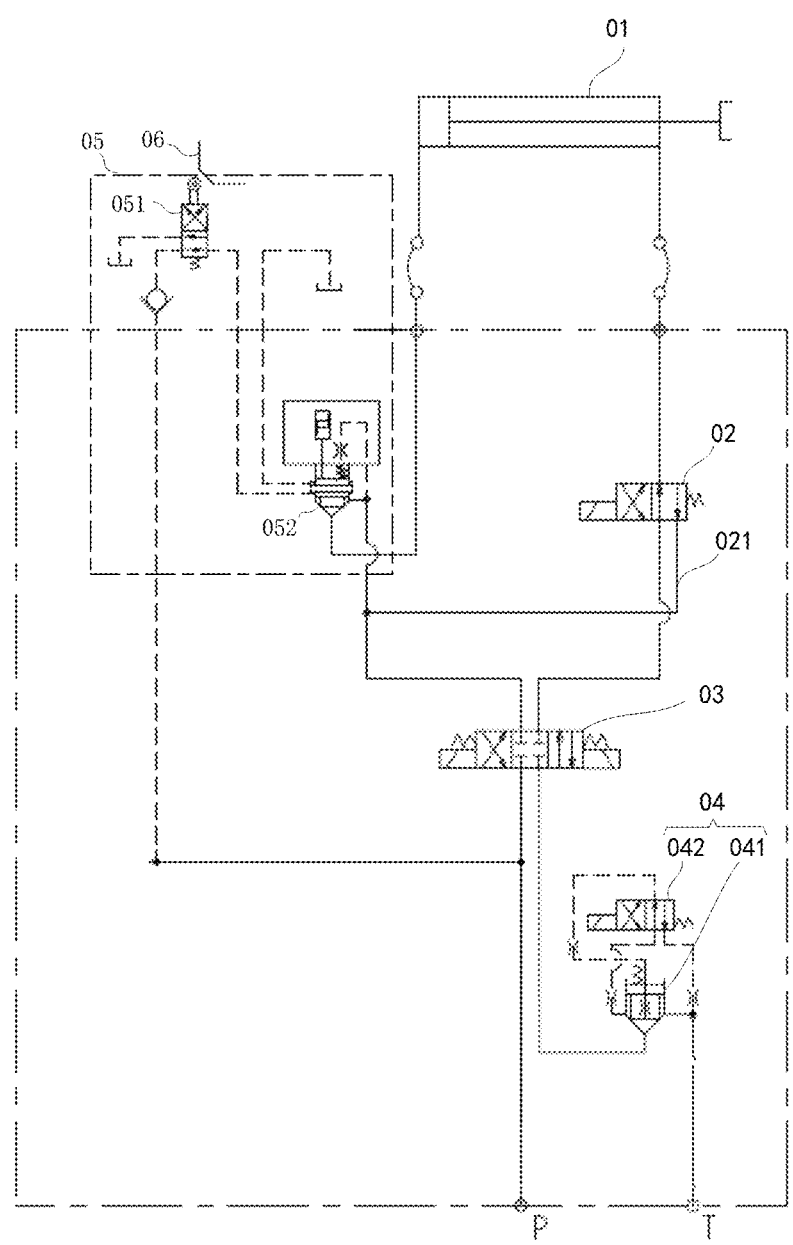
FIG. 1 is a system connection schematic drawing of a hydraulic circuit for opening and closing a mould of an injection moulding machine in the prior art.

It can be seen that the hydraulic circuit for opening and closing a mould of an injection moulding machine provided by the present invention has the following advantages:

I. In the hydraulic circuit for opening and closing a mould of an injection moulding machine provided by the present invention, not only can the operating oil cylinder 1 be controlled by means of the proportional valve 2 to realize mould opening and closing actions of the injection moulding machine, but also mould differential closing can be realized by means of the proportional valve 2, that is, the proportional valve 2 is a differential proportional valve having a flow regeneration function, and a differential circuit can be formed by the interior structure of the proportional valve 2; therefore, compared to the conventional circuit in FIG. 1, a second directional-control valve 02 and a middle oil path 021 can be dispensed with, thereby reducing the number of valve members and simplifying an oil path arrangement, which is beneficial for saving on the space taken up by the system.

II. Since the proportional valve can proportionally convert input electrical signals into force or displacement, parameters such as pressure and flow are continuously controlled, that is, electrical signals of the proportional valve are easily adjusted, which can realize different flow and action characteristics. Thus, in the hydraulic circuit for opening and closing a mould of an injection moulding machine provided by the present invention, by means of the proportional valve 2, in the process of the operating oil cylinder 1 driving mould opening/ mould closing of the injection moulding machine, hydraulic oil flow into and out of the operating oil cylinder 1 can be proportionally controlled according to actual requirements, so that the mould opening speed/ mould closing speed is continuously adjusted. Thus, with complete functions of mould opening and closing being realized, speed adjustment precision, positioning precision and repetition precision can be effectively increased in a mould opening/closing process.

III. Since in the mould closing process of the injection moulding machine, hydraulic oil flow into and out of the operating oil cylinder 1 can be proportionally controlled by means of the proportional valve 2, not only can fast mould opening/mould closing be made possible by means of the proportional valve 2, but also a brake effect can be realized by means of the proportional valve 2, without needing to provide the brake valve 04; therefore, compared to the conventional circuit in FIG. 1, the brake valve 04 can be eliminated, so that not only can energy consumption be reduced, but also corresponding testing on different models is not necessary.

In brief, in the hydraulic circuit for opening and closing a mould of an injection moulding machine provided by the present invention, by means of replacing the first directional-control valve 03, the second directional-control valve 02 and the brake valve 04 of the conventional solution with the differential proportional valve 2 having a flow regeneration function, with complete functions of mould opening and closing being realizable, control precision can also be effectively increased in a mould opening/closing process, energy consumption is reduced, the number of parts of a system is cut down, a hydraulic circuit is simplified and the space taken up by the system is saved on, which are beneficial for reducing system costs.

In a particular embodiment, the proportional valve 2 comprises a valve body, a spool and a driving apparatus. The valve body is provided with a first operating oil port B, a second operating oil port A, an inlet oil port P and a return oil port T; the spool is disposed in the valve body in such a way as to be capable of relative movement, and is used for controlling communication and isolation between different oil ports, that is, controlling the proportional valve 2 to switch between different operating states; the driving apparatus is used for controlling the spool to move, so as to adjust the spool to an appropriate operating state according to actual situations.

Specifically, referring to FIGS. 3 to 6, the interior of the valve body of the proportional valve 2 provided by embodiments of the present invention is provided with a first oil channel 221, a second oil channel 222, a third oil channel 223 and a fourth oil channel 224. The first oil channel 221 communicates with the return oil port T, thereby communicating with the return oil path L4; the second oil channel 222 communicates with the inlet oil port P, thereby communicating with the inlet oil path L3; the third oil channel 223 communicates with the first operating oil port B, thereby communicating with the first connecting oil path L1; and the fourth oil channel 224 communicates with the second operating oil port A, thereby communicating with the second connecting oil path L2. Here, it should be explained that to facilitate understanding, in FIGS. 3 to 6, the first operating oil port B, the second operating oil port A, the inlet oil port P and the return oil port T, which are respectively connected to oil channels, are marked at respective positions thereof.

In a preferred embodiment, a first recess 211, a second recess 212, a third recess 213, a fourth recess 214 and a fifth recess 215 are arranged on a side wall of the spool.

Figure 3:
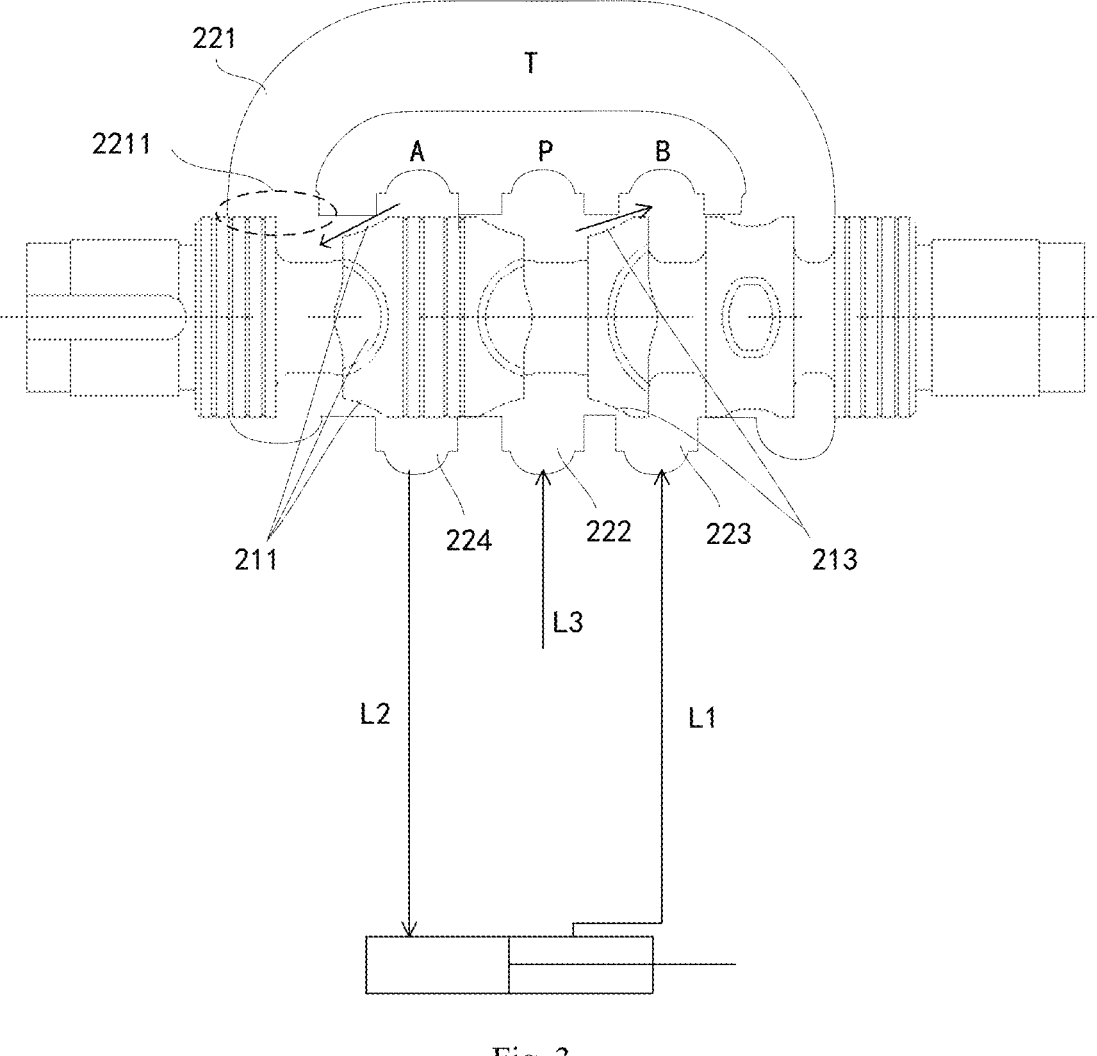
FIG. 3 is an operating state schematic drawing of a proportional valve when controlling mould opening of an injection moulding machine by a hydraulic circuit for opening and closing a mould of an injection moulding machine provided by an embodiment of the present invention.

When the proportional valve 2 is in the first operating state (see W1 in FIG. 2), as shown in FIG. 3, the second oil channel 222 communicates with the third oil channel 223 by means of the third recess 213, so that the inlet oil port P communicates with the first operating oil port B; moreover, the fourth oil channel 224 communicates with a first opening region 2211 of the first oil channel 221 by means of the first recess 211, so that the second operating oil port A communicates with the return oil port T. At this time, the first connecting oil path L1 communicates with the inlet oil path L3 by means of the proportional valve 2, the second connecting oil path L2 communicates with the return oil path L4 by means of the proportional valve 2, and the operating oil cylinder 1 controls mould opening of the injection moulding machine.

Figure 6:
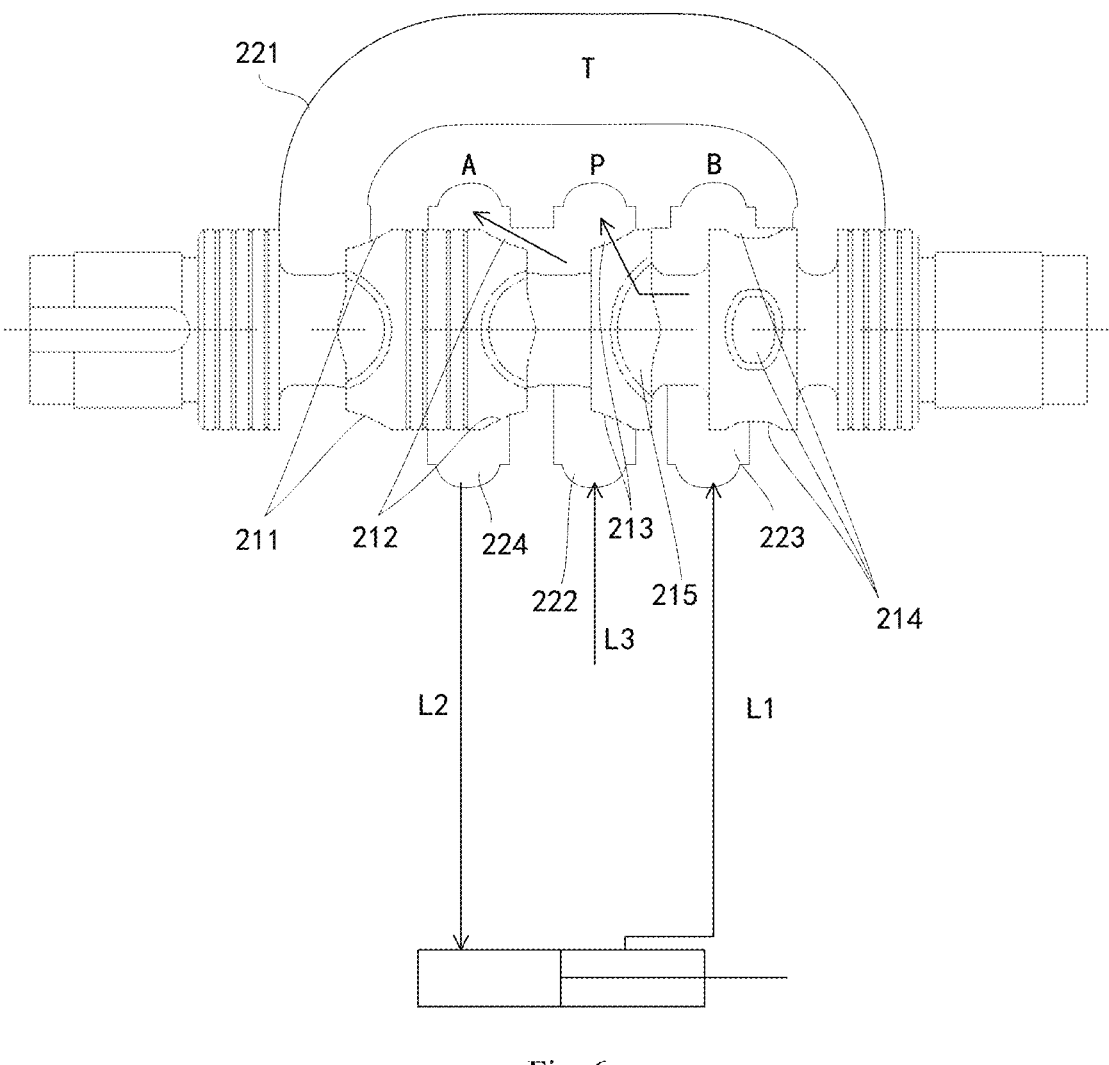

When the proportional valve 2 is in the second operating state (see W4 in FIG. 2), as shown in FIG. 6, the second oil channel 222 communicates with the fourth oil channel 224 by means of the second recess 212, and the second oil channel 222 communicates with the third oil channel 223 by means of the fifth recess 215. At this time, the first operating oil port B and the second operating oil port A both communicate with the inlet oil port P, so that the first connecting oil path L1 communicates with the second connecting oil path L2 by means of the proportional valve 2, and both communicate with the inlet oil port P; the operating oil cylinder 1 controls mould differential closing of the injection moulding machine, that is, oil conveyed through the inlet oil port P and oil output by the first cavity 11 of the operating oil cylinder through the first connecting oil path L1 both enter the second cavity 12 of the operating oil cylinder 1, realizing fast mould closing, and reducing energy consumption.

Figure 4:
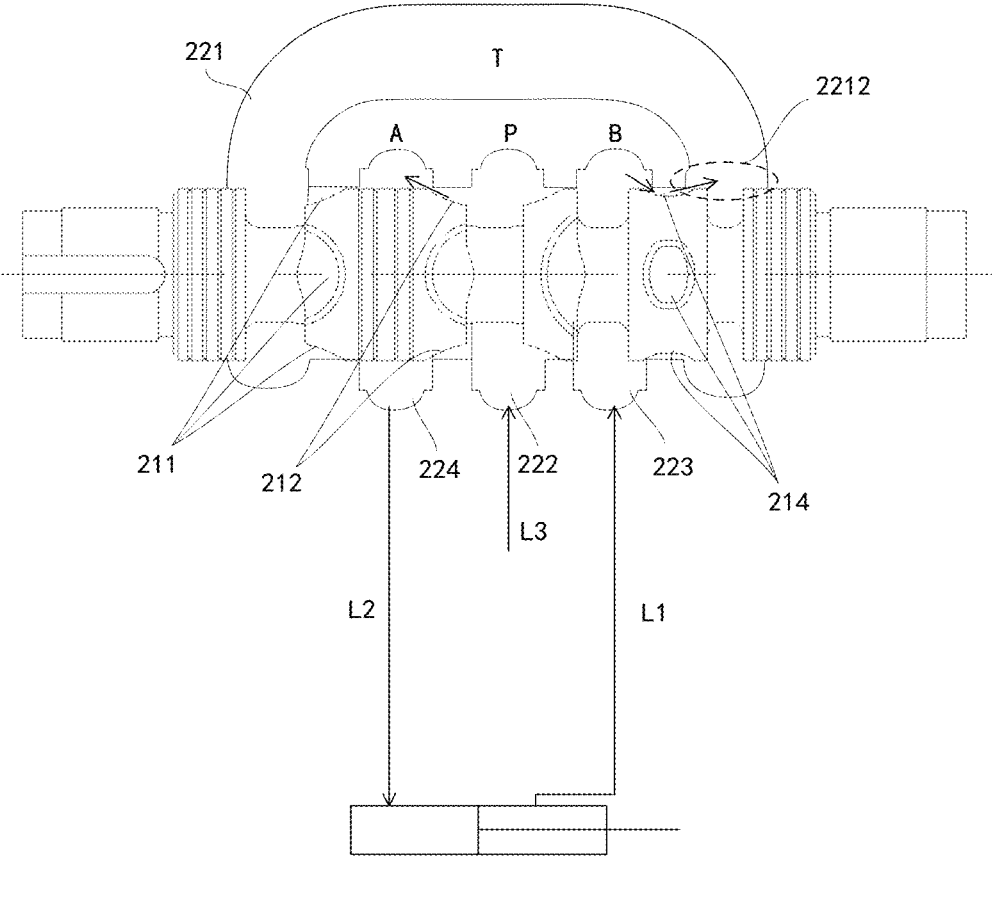
FIG. 4 to FIG. 6 are three different operating state schematic drawings of a proportional valve when controlling mould closing of an injection moulding machine by a hydraulic circuit for opening and closing a mould of an injection moulding machine provided by an embodiment of the present invention.

When the proportional valve 2 is in the third operating state (see W3 in FIG. 2), as shown in FIG. 4, the second oil channel 222 communicates with the fourth oil channel 224 by means of the second recess 212, so that the inlet oil port P communicates with the second operating oil port A; the third oil channel 223 communicates with a second opening region 2212 of the first oil channel 221 by means of the fourth recess 214, so that the first operating oil port B communicates with the return oil port T. At this time, the first connecting oil path L1 communicates with the return oil path L4 by means of the proportional valve 2, the second connecting oil path L2 communicates with the inlet oil path L3 by means of the proportional valve 2, and the operating oil cylinder 1 controls mould closing and pressing of the injection moulding machine.

Figure 5:
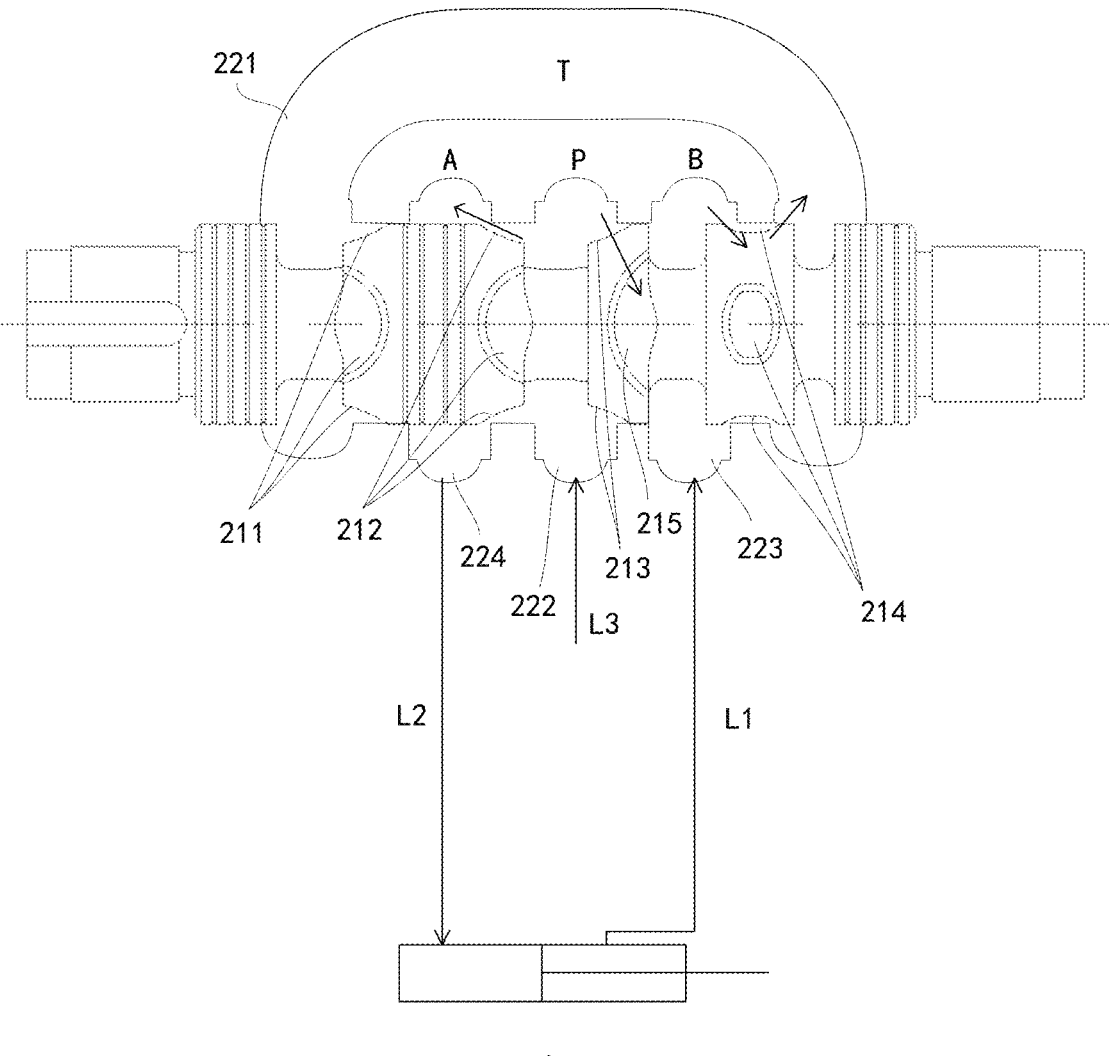

When the proportional valve 2 is in the fourth operating state, as shown in FIG. 5, the fourth oil channel 224, the second recess 212, the second oil channel 222, the fifth recess 215, the third oil channel 223, the fourth recess 214 and the second opening region 2212 of the first oil channel 221 communicate, that is, when the proportional valve 2 is in the H-type median function, at this time, the system discharges, and the operating oil cylinder 1 and an injection moulding machine upper mould connected thereto perform mould closing under the effect of gravity.

Figure 7:
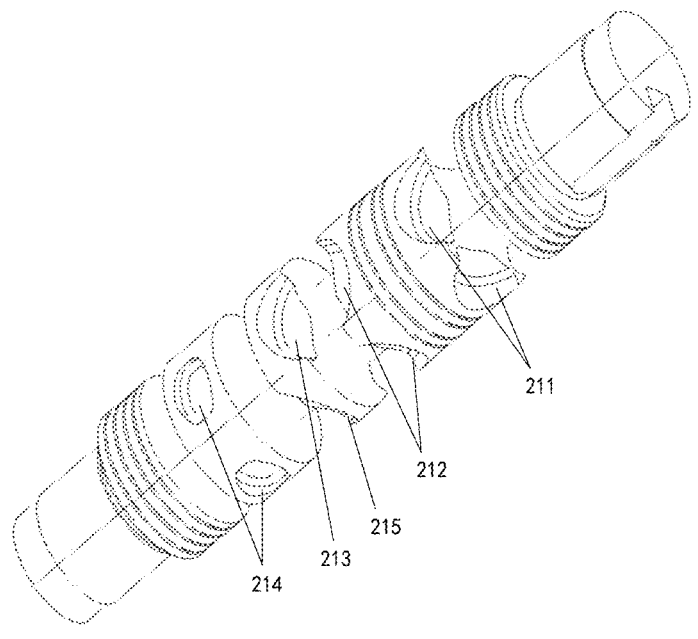
FIG. 7 is an axonometric drawing of the spool of a proportional valve provided by an embodiment of the present invention.
Figure 8:
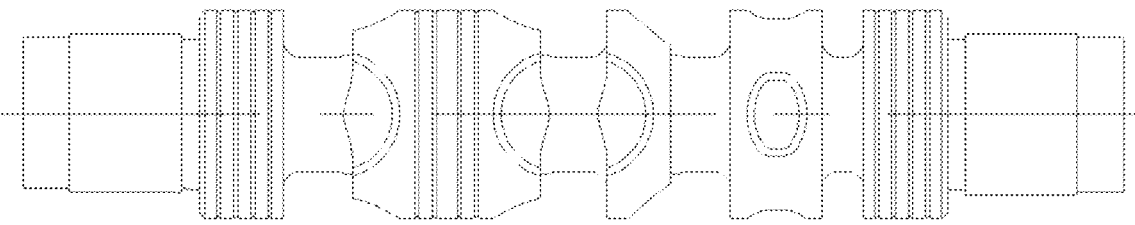
FIG. 8 is a main view of the spool of a proportional valve provided by an embodiment of the present invention.
Figure 9:
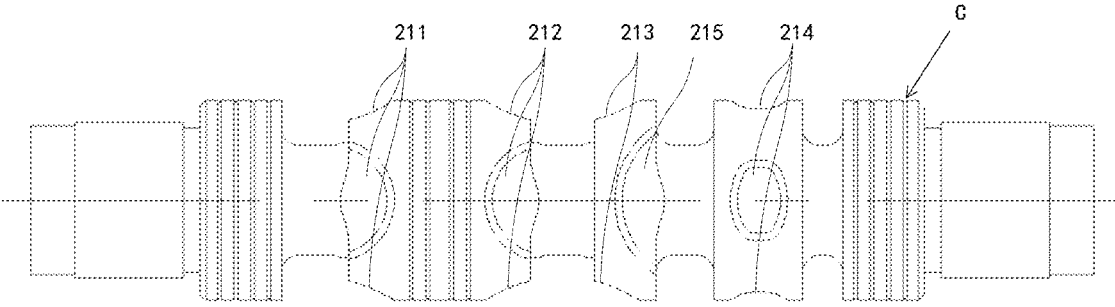
FIG. 9 is a top view of the spool of a proportional valve in FIG. 8.

Specifically, referring to FIGS. 7 to 9, projections of the first recess 211, the second recess 212, the third recess 213 and the fourth recess 214 on a central plane of the spool are arranged in sequence in an axial direction of the spool. Moreover, a plurality (for example, two or four) of the first recess 211, the second recess 212, the third recess 213 and the fourth recess 214 may be respectively provided along the circumference of the spool. Alternatively, in another particular embodiment, one of each of the first recess 211, the second recess 212, the third recess 213 and the fourth recess 214 may be provided.

Specifically, the fifth recess 215 and the third recess 213 are both located between the second recess 212 and the fourth recess 214. Moreover, a partial region of the fifth recess 215 and a partial region of the third recess 213 are arranged in a staggered manner in a circumferential direction of the spool. Another region of the fifth recess 215 is closer to the fourth recess 214 compared to the third recess 213; another region of the third recess 213 is closer to the second recess 212 compared to the fifth recess 215. Thus, as shown in FIGS. 3 to 5, the spool moves relative to the valve body, that is, can sequentially realize communication between P and B by means of the third recess 213 as shown in FIG. 3, isolation between P-B as shown in FIG. 4, and communication between P and B by means of the fifth recess 215 as shown in FIGS. 5 and 6, thus satisfies different requirements during mould opening, mould closing, H-type median function and mould differential closing.

In summary, embodiments of the present invention further provide an injection moulding machine system, the injection moulding machine system comprising an injection moulding machine mould, and a hydraulic circuit for controlling mould opening and closing of the injection moulding machine mould as described above.

When specifically implemented, referring to FIG. 2, the hydraulic circuit for mould opening and closing of an injection moulding machine comprises a proportional valve 2 (also called a proportional directional-control valve), an operating oil cylinder 1, a pressurized oil intake oil end (that is, the inlet oil port P), a mould closing safety valve 05 having a detection function, and a connecting pipeline assembly. A detection part 051 of the safety valve 05 is linked to a safety gate 06 of a device; only when the safety gate 06 is fully closed can a main valve part 052 of the safety valve 05 open, can pressurized oil of an oil supply end reach the proportional valve 2 and can the operating oil cylinder 1 move. At this time, the safety gate 06 triggers the detection part 051, and the detection part 051 controls the main valve part 052 to open, so that the second connecting oil path L2 is in a communicating state, and the operating oil cylinder 1 can be controlled to move.

During mould opening, a first driving apparatus D1 at the left side of the proportional valve 2 acts, oil passes through the proportional valve 2 to enter the first cavity 11 of the operating oil cylinder 1 (see a mould opening cavity located at the right side of the operating oil cylinder 1 in FIG. 2), the oil cylinder is pushed to realize a mould opening action, the oil of the second cavity 12 (see a mould closing cavity located at the left side of the operating oil cylinder 1 in FIG. 2), after passing through the proportional valve 2, returns to an oil tank. The whole process is controlled by the proportional valve 2, and the mould opening precision is high and the action is smooth.

When mould differential closing is necessary, a second driving apparatus D2 at the right side of the proportional valve 2 acts, the proportional valve 2 enters a right end operating position (see W4 in FIG. 2), pressurized oil from the first cavity 11 enters the second cavity 12 through a flow path inside the proportional valve 2, realizing a differential circuit, and realizing fast mould closing.

When mould closing and pressing are necessary, by means of adjusting electrical signals given to the proportional valve 2, the proportional valve 2 enters the third operating position from the left (see W3 in FIG. 2), realizing a fast increase in mould pressing force.

Finally, it should further be explained that relationship terms such as "first" and "second" as used herein are merely intended to distinguish one entity or operation from another entity or operation, and do not necessarily require or imply the existence of any such actual relationship or order between these entities or operations. Moreover, terms "comprise" and "include", or any other variant thereof, are intended to cover non-exclusive inclusion, so that a process, method, article or device which comprises a series of key elements does not comprise these key elements alone, but also comprises other key elements which are not listed explicitly.

Various embodiments in the description are all described in a progressive manner, and the same or similar parts across the various embodiments can make reference to each other. The emphasis of each embodiment is to describe points of difference to other embodiments.

With the above description of the disclosed embodiments, a person skilled in the art can implement or use the present invention. Various modifications to these embodiments would be obvious to a person skilled in the art; the general principle defined herein can be realized in other embodiments without departing from the spirit and scope of the present invention. Therefore, the present invention is not restricted to these embodiments illustrated herein, rather is to be in accord with the widest scope consistent with the principles and novel characteristics disclosed herein.

The invention claimed is:

1. A hydraulic circuit for opening and closing a mould of an injection moulding machine, characterized by comprising an operating oil cylinder and a proportional valve; by means of adjusting the proportional valve to different operating states, the operating oil cylinder can be controlled to execute different actions, so as to control mould opening, mould closing and mould differential closing of the injection moulding machine;

wherein a first operating oil port and a second operating oil port of the proportional valve are respectively connected to a first cavity and a second cavity of the operating oil cylinder by means of a first connecting oil path and a second connecting oil path; an inlet oil port and a return oil port of the proportional valve are respectively connected to an inlet oil path and a return oil path;

when the proportional valve is in a first operating state, the first connecting oil path communicates with the inlet oil path by means of the proportional valve, the second connecting oil path communicates with the return oil path by means of the proportional valve, and the operating oil cylinder controls mould opening of the injection moulding machine;

when the proportional valve is in a second operating state, the first connecting oil path and the second connecting oil path communicate by means of the proportional valve, and the operating oil cylinder controls mould differential closing of the injection moulding machine;

when the proportional valve is in a third operating state, the first connecting oil path communicates with the return oil path by means of the proportional valve, the second connecting oil path communicates with the inlet oil path by means of the proportional valve, and the operating oil cylinder controls mould closing and pressing of the injection moulding machine;

wherein the proportional valve comprises a valve body, a spool and a driving apparatus;

wherein the valve body is provided with the first operating oil port, the second operating oil port, the inlet oil port and the return oil port;

wherein the spool is disposed inside the valve body in such a way as to be capable of relative movement, and is used for controlling communication and isolation between different oil ports;

wherein the driving apparatus is used for controlling the movement of the spool;

wherein the valve body is provided with:

a first oil channel, which communicates with the return oil port, so as to connect the return oil path;

a second oil channel, which communicates with the inlet oil port, so as to connect the inlet oil path;

a third oil channel, which communicates with the first operating oil port, so as to connect the first connecting oil path; and a fourth oil channel, which communicates with the second operating oil port, so as to connect the second connecting oil path;

wherein a side wall of the spool is provided with a first recess, a second recess, a third recess, a fourth recess and a fifth recess;

wherein when the proportional valve is in the first operating state, the second oil channel communicates with the third oil channel by means of the third recess, and the fourth oil channel communicates with the first oil channel by means of the first recess;

wherein when the proportional valve is in the second operating state, the second oil channel communicates with the fourth oil channel by means of the second recess, and the second oil channel communicates with the third oil channel by means of the fifth recess;

wherein when the proportional valve is in the third operating state, the second oil channel communicates with the fourth oil channel by means of the second recess, and the third oil channel communicates with the first oil channel by means of the fourth recess;

wherein when the proportional valve is in a fourth operating state, the fourth oil channel, the second recess, the second oil channel, the fifth recess, the third oil channel, the fourth recess and the first oil channel communicate;

wherein the fifth recess and the third recess are both located between the second recess and the fourth recess;

wherein a partial region of the fifth recess and a partial region of the third recess are arranged in a staggered manner in a circumferential direction of the spool;

wherein another region of the fifth recess is closer to the fourth recess compared to the third recess; and wherein another region of the third recess is closer to the second recess compared to the fifth recess.

2. The hydraulic circuit for opening and closing a mould of an injection moulding machine according to claim 1, wherein when the proportional valve is in the fourth operating state, the first operating oil port, the second operating oil port, the inlet oil port and the return oil port communicate with each other; and the fourth operating state is a transition state between the second operating state and the third operating state; or the fourth operating state is an operating position of the proportional valve.

3. The hydraulic circuit for opening and closing a mould of an injection moulding machine according to claim 1, wherein projections of the first recess, the second recess, the third recess and the fourth recess on a central plane of the spool are arranged in sequence in an axial direction of the spool;

and/or one of each of the first recess, the second recess, the third recess and the fourth recess are provided, or a plurality thereof are respectively provided along the circumference of the spool.

4. An injection moulding machine system, characterized by being provided with a hydraulic circuit for opening and closing a mould of an injection moulding machine, wherein, the hydraulic circuit comprises an operating oil cylinder and a proportional valve; by means of adjusting the proportional valve to different operating states, the operating oil cylinder can be controlled to execute different actions, so as to control mould opening, mould closing and mould differential closing of the injection moulding machine;

wherein a first operating oil port and a second operating oil port of the proportional valve are respectively connected to a first cavity and a second cavity of the operating oil cylinder by means of a first connecting oil path and a second connecting oil path; an inlet oil port and a return oil port of the proportional valve are respectively connected to an inlet oil path and a return oil path;

when the proportional valve is in a first operating state, the first connecting oil path communicates with the inlet oil path by means of the proportional valve, the second connecting oil path communicates with the return oil path by means of the proportional valve, and the operating oil cylinder controls mould opening of the injection moulding machine;

when the proportional valve is in a second operating state, the first connecting oil path and the second connecting oil path communicate by means of the proportional valve, and the operating oil cylinder controls mould differential closing of the injection moulding machine;

when the proportional valve is in a third operating state, the first connecting oil path communicates with the return oil path by means of the proportional valve, the second connecting oil path communicates with the inlet oil path by means of the proportional valve, and the operating oil cylinder controls mould closing and pressing of the injection moulding machine;

wherein the proportional valve comprises a valve body, a spool and a driving apparatus;

wherein the valve body is provided with the first operating oil port, the second operating oil port, the inlet oil port and the return oil port;

wherein the spool is disposed inside the valve body in such a way as to be capable of relative movement, and is used for controlling communication and isolation between different oil ports;

wherein the driving apparatus is used for controlling the movement of the spool;

wherein the valve body is provided with:

a first oil channel, which communicates with the return oil port, so as to connect the return oil path;

a second oil channel, which communicates with the inlet oil port, so as to connect the inlet oil path;

a third oil channel, which communicates with the first operating oil port, so as to connect the first connecting oil path; and a fourth oil channel, which communicates with the second operating oil port, so as to connect the second connecting oil path;

wherein a side wall of the spool is provided with a first recess, a second recess, a third recess, a fourth recess, and a fifth recess;

when the proportional valve is in the first operating state, the second oil channel communicates with the third oil channel by means of the third recess, and the fourth oil channel communicates with the first oil channel by means of the first recess;

when the proportional valve is in the second operating state, the second oil channel communicates with the fourth oil channel by means of the second recess, and the second oil channel communicates with the third oil channel by means of the fifth recess;

when the proportional valve is in the third operating state, the second oil channel communicates with the fourth oil channel by means of the second recess, and the third oil channel communicates with the first oil channel by means of the fourth recess;

wherein when the proportional valve is in a fourth operating state, the fourth oil channel, the second recess, the second oil channel, the fifth recess, the third oil channel, the fourth recess and the first oil channel communicate;

wherein the fifth recess and the third recess are both located between the second recess and the fourth recess;

a partial region of the fifth recess and a partial region of the third recess are arranged in a staggered manner in a circumferential direction of the spool;

another region of the fifth recess is closer to the fourth recess compared to the third recess; and another region of the third recess is closer to the second recess compared to the fifth recess.

5. The injection moulding machine system according to claim 4, wherein when the proportional valve is in the fourth operating state, the first operating oil port, the second operating oil port, the inlet oil port and the return oil port communicate with each other; and the fourth operating state is a transition state between the second operating state and the third operating state; or the fourth operating state is an operating position of the proportional valve.

6. The injection moulding machine system according to claim 4, wherein projections of the first recess, the second recess, the third recess and the fourth recess on a central plane of the spool are arranged in sequence in an axial direction of the spool;

one of each of the first recess, the second recess, the third recess and the fourth recess are provided, or a plurality thereof are respectively provided along the circumference of the spool.

* * * * *